(12) United States Patent
Chang et al.

(10) Patent No.: US 10,698,499 B1
(45) Date of Patent: Jun. 30, 2020

(54) MOUSE DEVICE

(71) Applicant: Primax Electronics Ltd., Taipei (TW)

(72) Inventors: Chia-Yuan Chang, Taipei (TW); Chun-Lin Chu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/363,450

(22) Filed: Mar. 25, 2019

(30) Foreign Application Priority Data

Jan. 25, 2019 (TW) .............................. 108102932 A

(51) Int. Cl.
  *G06F 3/02* (2006.01)
  *H01H 13/803* (2006.01)
  *H01H 13/705* (2006.01)

(52) U.S. Cl.
  CPC ......... *G06F 3/0202* (2013.01); *H01H 13/705* (2013.01); *H01H 13/803* (2013.01); *H01H 2235/008* (2013.01)

(58) Field of Classification Search
  CPC ... G06F 3/0202; H01H 13/705; H01H 13/803
  USPC ......................................................... 200/329
  See application file for complete search history.

(56) References Cited

U.S. PATENT DOCUMENTS

2009/0009473 A1* 1/2009 Ho ...................... G06F 3/03543
  345/163
2011/0279371 A1* 11/2011 Ma ...................... G06F 3/03543
  345/163

* cited by examiner

*Primary Examiner* — Nguyen Tran
*Assistant Examiner* — Iman Malakooti
(74) *Attorney, Agent, or Firm* — Kirton McConkie; Evan R. Witt

(57) ABSTRACT

A mouse device includes a lower casing, a circuit board, an upper casing, a button and an elastic element. The switch module is disposed on the circuit board. The circuit board is located over the lower casing. The upper casing has a slot. The upper casing and the lower casing are combined together. The button includes a push structure. The push structure includes a contacting portion corresponding to the switch module. The push structure is penetrated through the slot. The button is pivotally coupled to the upper casing. Consequently, the button is permitted to be swung relative to the upper casing. The elastic element is arranged between the contacting portion and the upper casing. Moreover, two ends of the elastic element are respectively contacted with the contacting portion and the upper casing. Consequently, the contacting portion is in contact with the switch element.

6 Claims, 6 Drawing Sheets

MOUSE DEVICE

FIELD OF THE INVENTION

The present invention relates to an input device, and more particularly to a mouse device.

BACKGROUND OF THE INVENTION

A mouse is used to control a cursor on a computer screen in order to operate the computer. Since 1968, the United States has produced the world's first mouse. After then, the mouse is applied to paper processing operations, video games, industrial drawings, drawing design or media production. Consequently, the mouse has become an indispensable part of the computer system. In the early stage, the mouse uses a trackball to detect the displacement of the mouse. With increasing development of science and technology, an optical module or a laser module is used to detect the displacement of the mouse in order to enhance the working efficiency. Moreover, for increasing the functionality and convenience of the mouse, the earliest wired single-button mouse is gradually evolved into the modern wireless multi-button roller mouse. For complying with different industrial needs or personal preferences, various electronic manufacturers have begun to create a variety of mouse devices with different shapes or with composite functions in order to meet the operation requirements of different users.

Hereinafter, a conventional mouse device will be described with reference to FIGS. 1 and 2. FIG. 1 is a schematic perspective view illustrating the appearance of a conventional mouse device. The conventional mouse device 9 comprises an upper casing 90, a lower casing 91 and an upper base 92. The upper casing 90 and the lower casing 91 are combined together through the upper base 92. A control side of the upper casing 90 comprises an integral button 901. FIG. 2 is a schematic cross-sectional view illustrating the mouse device as shown in FIG. 1 and taken along the line A-A'. As shown in FIG. 2, a switch module 70 and a circuit board 80 are installed within an inner accommodation space of the mouse device 9. The switch module 70 is disposed on the circuit board 80. The switch module 70 comprises a switch element 701 and a triggering part 702. The triggering part 702 is disposed on the switch element 701. Moreover, a pressing structure 902 corresponding to the triggering part 702 is disposed on a surface of the button 901. The pressing structure 902 is penetrated through an opening 921 of the upper base 92 and located over the triggering part 702. When the button 901 is pressed by the user, the triggering part 702 is pushed by the pressing structure 902. Consequently, the switch module 70 generates a corresponding control signal.

However, the conventional mouse device still has some drawbacks. For example, there is a gap G between the pressing structure 902 and the triggering part 702. While the button 901 is pressed, an empty travel distance exits. Since the switch module 70 is unable to generate the control signal promptly. Under this circumstance, the tactile feel of clicking the button 901 is impaired.

For solving the drawbacks of the conventional technologies, there is a need of providing a mouse device for avoiding the empty travel distance while a button is pressed.

SUMMARY OF THE INVENTION

The present invention provides a mouse device for avoiding the empty travel distance while a button is pressed. In response to a pressing action of the user on the button, a switch module of the mouse device generates a corresponding signal promptly. Consequently, the tactile feel of clicking the button is enhanced.

In accordance with an aspect of the present invention, there is provided a mouse device. The mouse device includes a lower casing, a circuit board, an upper casing, a button and an elastic element. The switch module is disposed on the circuit board. The circuit board is located over the lower casing. The upper casing has a slot. The upper casing and the lower casing are combined together. The button includes a push structure. The push structure includes a contacting portion corresponding to the switch module. The push structure is penetrated through the slot. The button is pivotally coupled to the upper casing. Consequently, the button is permitted to be swung relative to the upper casing. The elastic element is arranged between the contacting portion and the upper casing. Moreover, two ends of the elastic element are respectively contacted with the contacting portion and the upper casing. Consequently, the contacting portion is in contact with the switch element.

In an embodiment, the elastic element is a compression spring, and an elastic force provided by the compression spring is lower than 10 g. Consequently, the contacting portion is in contact with the switch module but the switch module is not triggered.

In an embodiment, the push structure further includes a receiving recess, and the compression spring is received and positioned in the receiving recess.

In an embodiment, a position-limiting post is protruded from a closed end of the slot, and the position-limiting post is penetrated through the compression spring to position the compression spring.

In an embodiment, a first surface of the contacting portion is in contact with the switch module, and a position-limiting post is protruded from a second surface of the contacting portion. The position-limiting post is penetrated through the compression spring to position the compression spring.

In an embodiment, the button includes a pressing part and a bent connection part. The bent connection part is connected with the pressing part. The push structure is protruded from a surface of the pressing part.

In an embodiment, a concave structure is formed in the upper casing. A shape of the concave structure matches a shape of the pressing part. The pressing part is disposed within the concave structure.

In an embodiment, an opening is formed in a bottom side of the concave structure, and a support structure is protruded from an inner surface of the upper casing. The bent connection part is penetrated through the opening and pivotally coupled to the support structure.

In an embodiment, the switch module includes a switch element and a triggering part. When the button is not pressed, the contacting portion is in contact with the triggering part but the switch module is not triggered by the contacting portion.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
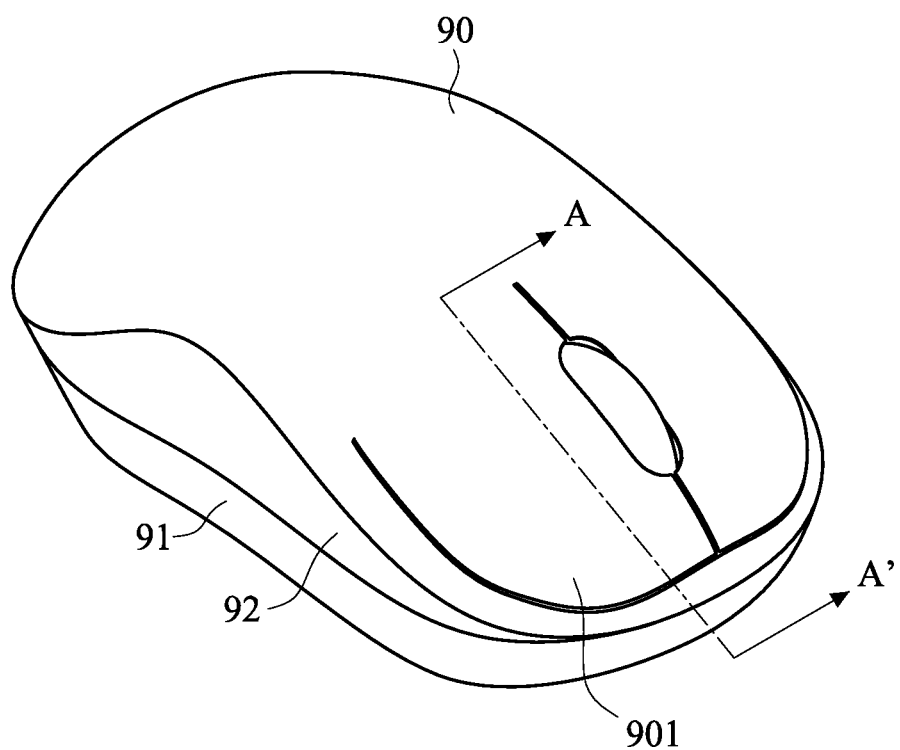
FIG. 1 is a schematic perspective view illustrating the appearance of a conventional mouse device.
Figure 2:
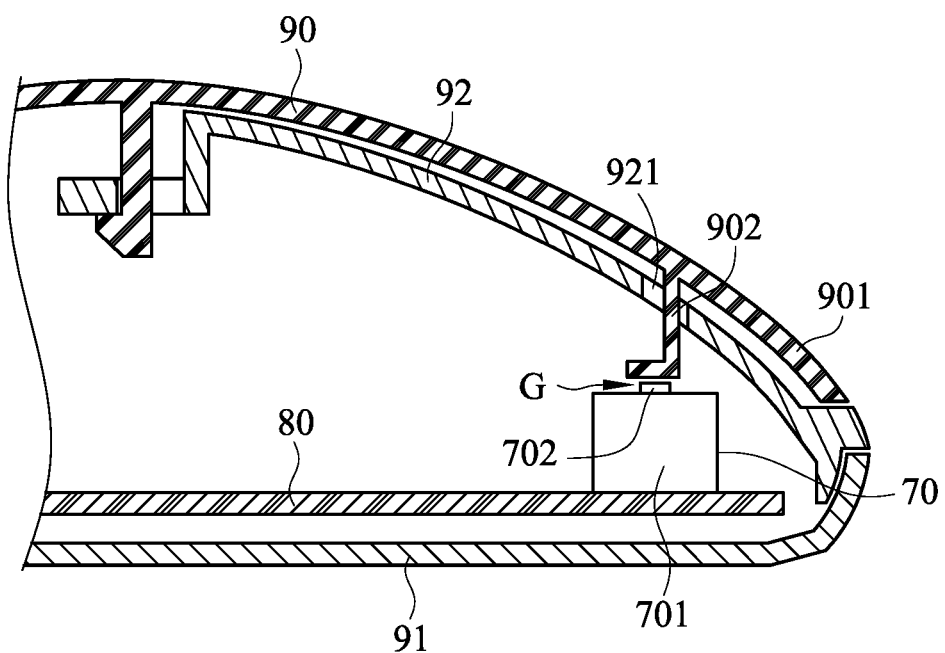
FIG. 2 is a schematic cross-sectional view illustrating the mouse device as shown in FIG. 1 and taken along the line A-A'.
Figure 3:
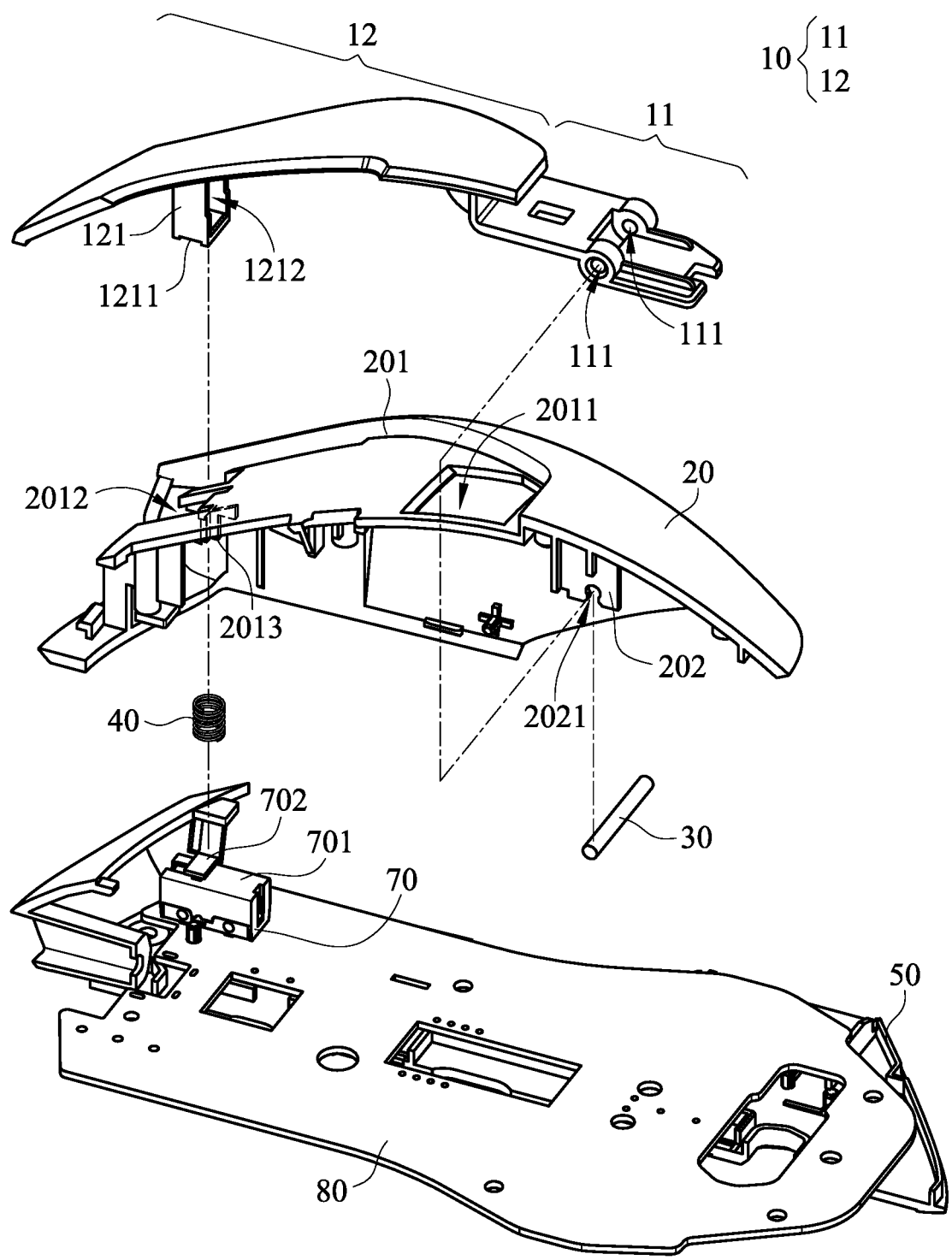
FIG. 3 is a schematic perspective view illustrating a mouse device according to an embodiment of the present invention and taken along a viewpoint.
Figure 4:
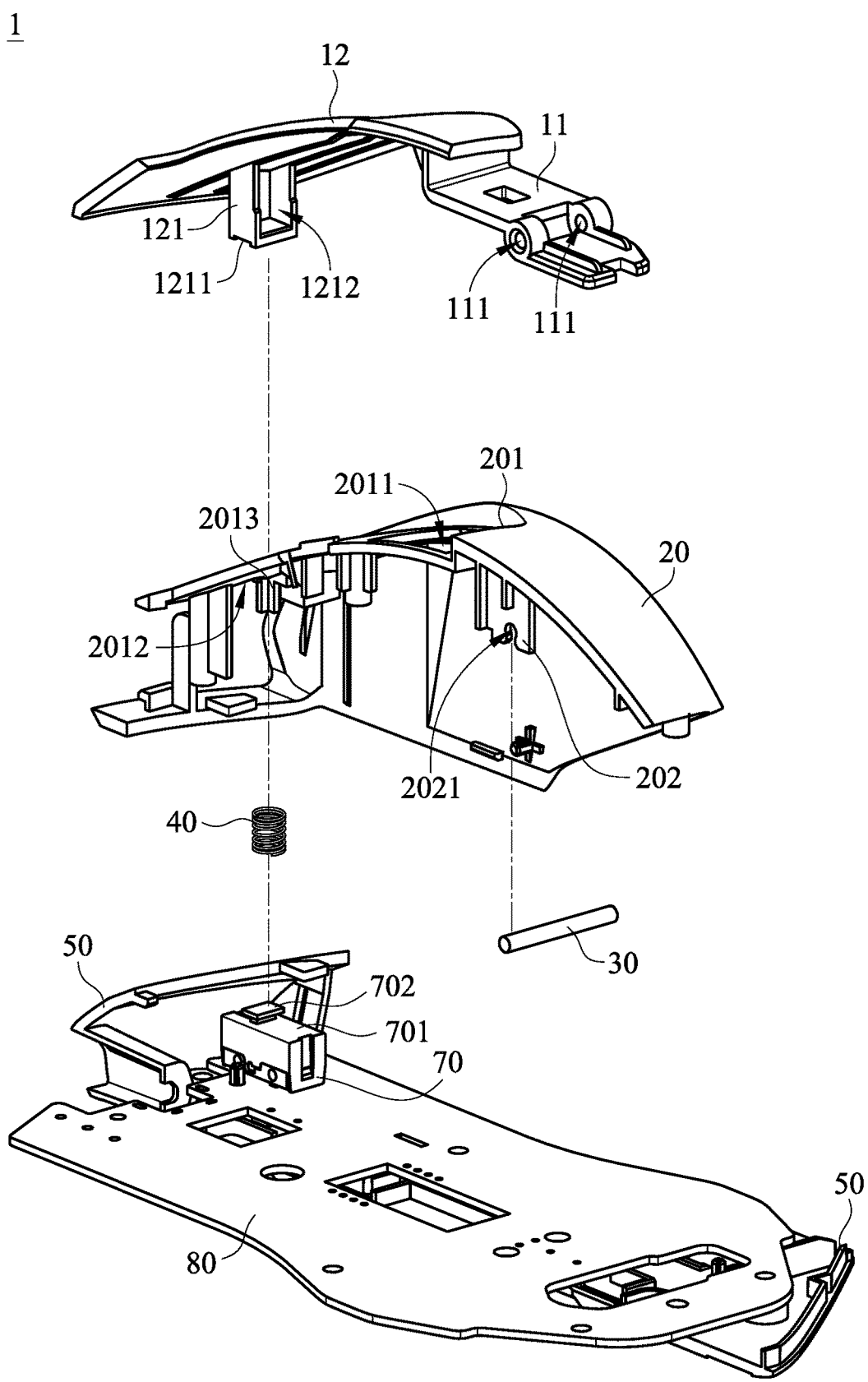
FIG. 4 is a schematic perspective view illustrating a mouse device according to the embodiment of the present invention and taken along another viewpoint.

Please refer to FIGS. 3 and 4. FIG. 3 is a schematic perspective view illustrating a mouse device according to an embodiment of the present invention and taken along a viewpoint. FIG. 4 is a schematic perspective view illustrating a mouse device according to the embodiment of the present invention and taken along another viewpoint. The mouse device 1 comprises a button 10, an upper casing 20, an elastic element 40, a lower casing 50, a switch module 70 and a circuit board 80. After the upper casing 20 and the lower casing 50 are combined together, an accommodation space is formed within the mouse device 1. For example, the elastic element 40 is a compression spring. The circuit board 80 is disposed within the accommodation space and located over the lower casing 50. The switch module 70 is disposed on the circuit board 80. The switch module 70 is disposed on the circuit board 80. The switch module 70 comprises a switch element 701 and a triggering part 702. The triggering part 702 is disposed on the switch element 701.

The button 10 comprises a pressing part 12 and a bent connection part 11. The bent connection part 11 is connected with the pressing part 12. A push structure 121 is protruded from a surface of the pressing part 12. The push structure 121 is aligned with the triggering part 702 of the switch module 70. The bent connection part 11 comprises two pivotal holes 111. In an embodiment, the push structure 121 comprises a contacting portion 1211 and a receiving recess 1212. The contacting portion 1211 is in contact with the triggering part 702 of the switch module 70. The elastic element 40 is received within the receiving recess 1212. That is, the elastic element 40 is positioned in the receiving recess 1212.

A concave structure 201 is formed in an outer surface of the upper casing 20. The shape of the concave structure 201 matches the shape of the pressing part 12. A support structure 202 is protruded from an inner surface of the upper casing 20. An opening 2011 and a slot 2012 are formed in a bottom side of the concave structure 201. The slot 2012 is located at a control side. Moreover, the slot 2012 is aligned with the push structure 121. Consequently, the push structure 121 is penetrated through the slot 2012 and contacted with the triggering part 702 of the switch module 70. A position-limiting post 2013 is protruded from a closed end of the slot 2012. The position-limiting post 2013 is penetrated through the elastic element 40 for positioning the elastic element 40 in the receiving recess 1212. The two ends of the elastic element 40 are contacted with the contacting portion 1211 of the push structure 121 and the inner surface of the upper casing 20, respectively.

The bent connection part 11 is penetrated through the opening 2011 and pivotally coupled to the support structure 202. In an embodiment, the support structure 202 comprises a locking notch 2021. A shaft 30 is penetrated through the pivotal holes 111 and the locking notch 2021. The button 10 is pivotally coupled to the upper casing 20 through the bent connection part 11 and the support structure 202. Consequently, the button 10 can be swung relative to the upper casing 20.

Figure 5A:
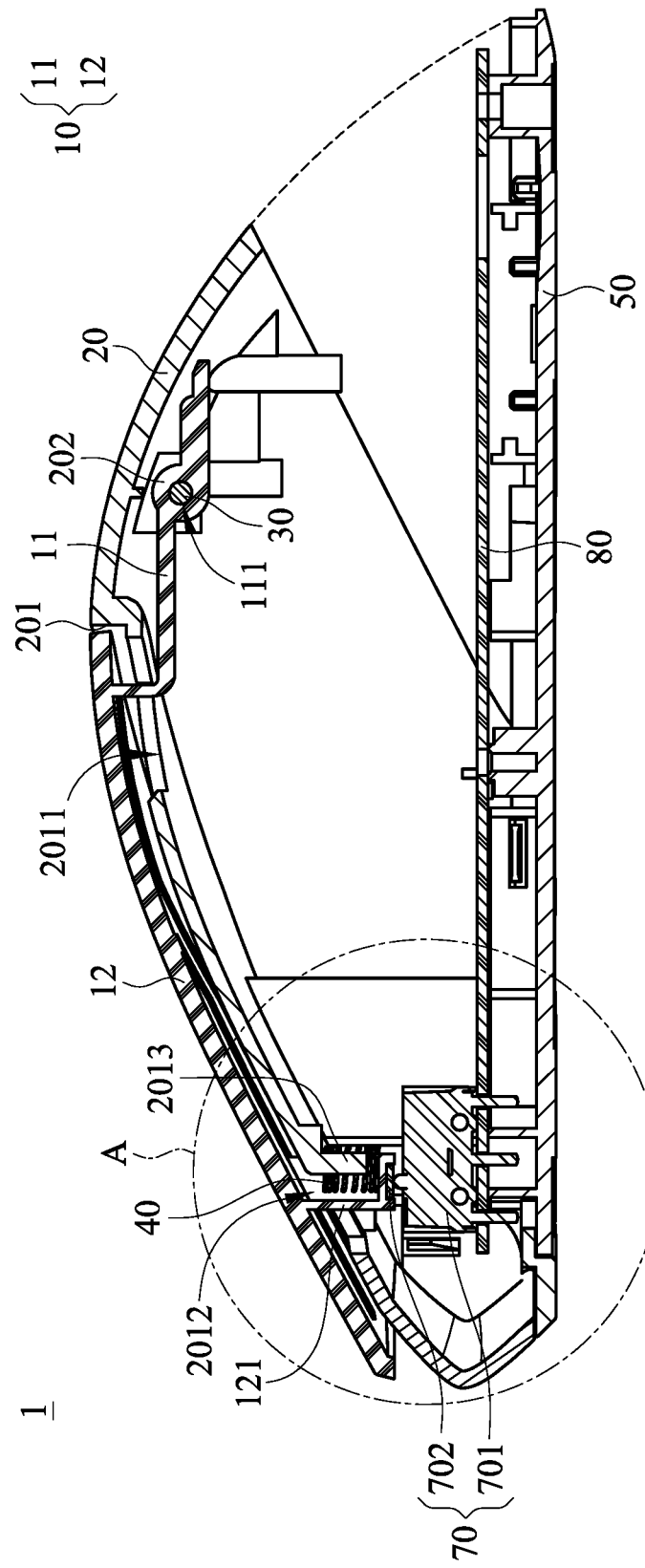
FIG. 5A is a schematic cross-sectional view illustrating the mouse device according to the embodiment of the present invention.
Figure 5B:
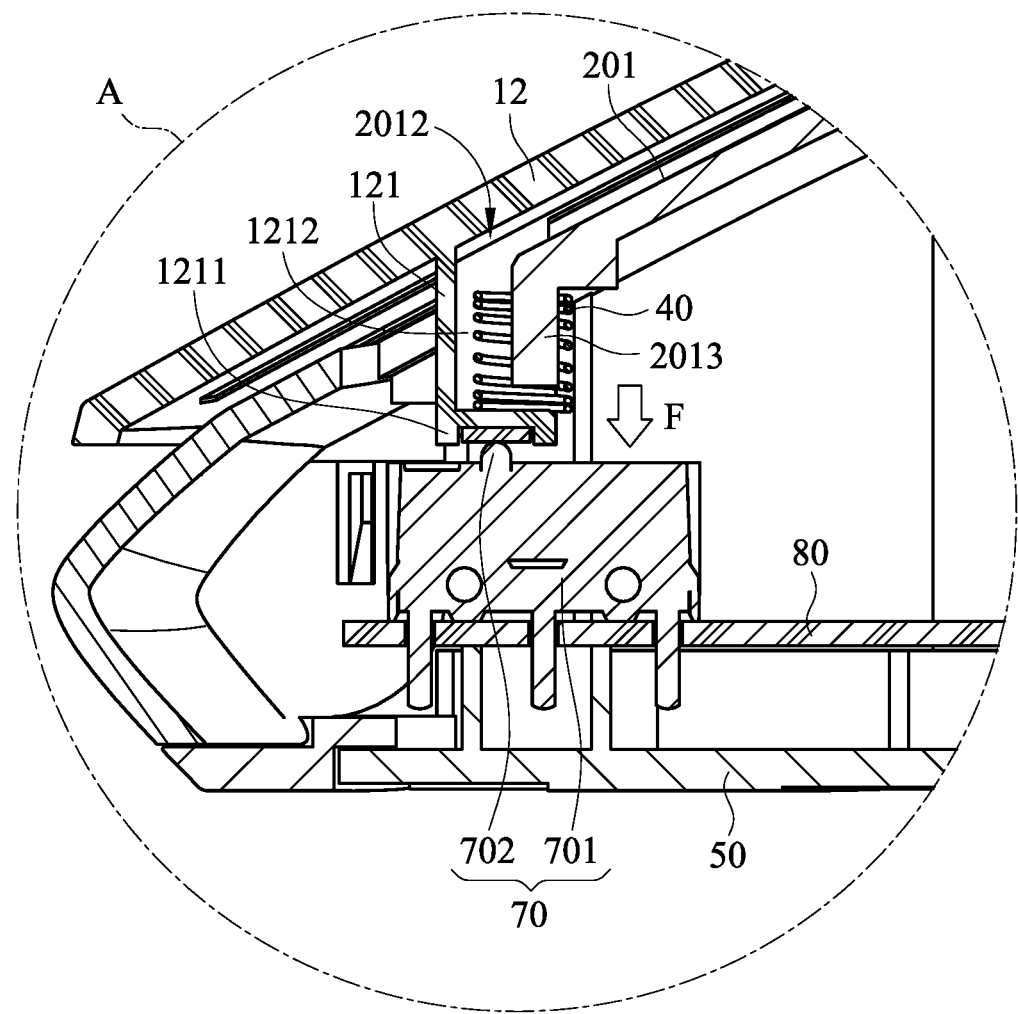
FIG. 5B is a schematic enlarged view illustrating the region A as shown in FIG. 5A.

FIG. 5A is a schematic cross-sectional view illustrating the mouse device according to the embodiment of the present invention. FIG. 5B is a schematic enlarged view illustrating the region A as shown in FIG. 5A. As shown in FIG. 5A, the upper casing 20 and the lower casing 50 are combined together. The bent connection part 11 is penetrated through the opening 2011 of the upper casing 20 and pivotally coupled to the support structure 202. Moreover, the push structure 121 is penetrated through the slot 2012 and contacted with the triggering part 702 of the switch module 70.

Please refer to FIG. 5B. The elastic element 40 is disposed within the receiving recess 1212. The position-limiting post 2013 is penetrated through the elastic element 40 for positioning the elastic element 40 in the receiving recess 1212. Consequently, the elastic element 40 is positioned between the contacting portion 1211 and the upper casing 20. Since the two ends of the elastic element 40 are respectively contacted with the contacting portion 1211 and the inner surface of the upper casing 20, the elastic element 40 provides an elastic force F to the contacting portion 1211. In response to the elastic force F, the contacting portion 1211 is in close contact with the triggering part 702 of the switch module 70. However, the elastic force F is not large enough to trigger the switch module 70. In this embodiment, the elastic force F is lower than 10 g.

In the above embodiment, the elastic element 40 is a compression spring. It is noted that the example of the elastic element is not restricted. For example, in another embodiment, the elastic element 40 is made of another elastic material such as elastic rubber, elastic silicone or resilience sheet. The contacting portion 1211 has a first surface and a second surface, which are opposed to each other. The first surface of the contacting portion 1211 is in contact with the switch module 70. In the above embodiment as shown in FIG. 3 or FIG. 4, the position-limiting post 2013 is protruded from the closed end of the slot 2012. In another embodiment, the position-limiting post 2013 is protruded from the second surface of the contacting portion 1211. Alternatively, the position-limiting post is omitted, and the elastic element 40 is received and positioned in the receiving recess 1212. In other words, the above examples are presented herein for purpose of illustration and description only.

Please refer to FIG. 5B. Since the contacting portion 1211 is in contact with the triggering part 702 of the switch module 70, there is no gap between the contacting portion 1211 and the triggering part 702. While the pressing part 12 of the button 10 is pressed by the user, the contacting portion 1211 can push the triggering part 702 promptly. Consequently, the tactile feel corresponding the empty travel distance is not generated, and the switch module 70 is precisely triggered to generate the control signal. Moreover, while the button 10 is pressed by the user, the elastic element 40 is elastically stretched. Since the force for pressing the button 10 by the user is decreased, the tactile feel of pressing the button 10 is enhanced.

From the above descriptions, the present invention provides the mouse device. The mouse device is equipped with the elastic element for avoiding the generation of the empty travel distance. In response to the pressing action of the user, the switch module of the mouse device is triggered promptly to generate the corresponding control signal. Moreover, while the button is pressed by the user, the elastic element is elastically stretched. Since the force for pressing the button by the user is decreased, the tactile feel of pressing the button is enhanced. In other words, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse device, comprising:
    a lower casing;
    a circuit board, wherein a switch module is disposed on the circuit board, and the circuit board is located over the lower casing;
    an upper casing having a slot, wherein the upper casing and the lower casing are combined together;
    a button comprising a push structure, wherein the push structure comprises a contacting portion corresponding to the switch module, the push structure is penetrated through the slot, and the button is pivotally coupled to the upper casing, so that the button is permitted to be swung relative to the upper casing; and
    an elastic element arranged between the contacting portion and the upper casing,
    wherein two ends of the elastic element are respectively contacted with the contacting portion and the upper casing, so that the contacting portion is in contact with the switch element; wherein the elastic element is a compression spring, and an elastic force provided by the compression spring is lower the 10 g, so that the contacting portion is in contact with the switch module but the switch module is not triggered, and wherein a first surface of the contacting portion is in contact with the switch module, and a position-limiting post is protruded from a second surface of the contacting portion, wherein the position-limiting post is penetrated through the compression spring to the position the compression spring.

2. The mouse device according to claim 1, wherein the push structure further comprises a receiving recess, and the compression spring is received and positioned in the receiving recess.

3. The mouse device according to claim 1, wherein the button comprises a pressing part and a bent connection part, wherein the bent connection part is connected with the pressing part, and the push structure is protruded from a surface of the pressing part.

4. The mouse device according to claim 3, wherein a concave structure is formed in the upper casing, wherein a shape of the concave structure matches a shape of the pressing part, and the pressing part is disposed within the concave structure.

5. The mouse device according to claim 4, wherein an opening is formed in a bottom side of the concave structure, and a support structure is protruded from an inner surface of the upper casing, wherein the bent connection part is penetrated through the opening and pivotally coupled to the support structure.

6. The mouse device according to claim 1, wherein the switch module comprises a switch element and a triggering part, wherein when the button is not pressed, the contacting portion is in contact with the triggering part but the switch module is not triggered by the contacting portion.

* * * * *